United States Patent
Desurvire et al.

(10) Patent No.: US 6,373,608 B1
(45) Date of Patent: Apr. 16, 2002

(54) METHOD AND DEVICE FOR ON-LINE REGENERATION OF A SIGNAL TRANSMITTED BY WAVELENGTH DIVISION MULTIPLEXED SOLITONS AND OPTICAL TELECOMMUNICATION SYSTEM COMPRISING SUCH A REGENERATING DEVICE

(75) Inventors: Emmanuel Desurvire, Bruyere le Chatel; Jean-Pierre Hamaide, St-Germain-les-Arpajon, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/155,901

(22) PCT Filed: Feb. 10, 1998

(86) PCT No.: PCT/FR98/00258

§ 371 Date: Feb. 18, 1999

§ 102(e) Date: Feb. 18, 1999

(87) PCT Pub. No.: WO98/35459

PCT Pub. Date: Aug. 13, 1998

(30) Foreign Application Priority Data

Feb. 10, 1997 (FR) .............................. 97 01476

(51) Int. Cl.⁷ ..................... H04B 10/00; H04B 10/12; H04B 10/18
(52) U.S. Cl. .................. 359/158; 359/124; 359/161
(58) Field of Search ................ 359/124, 158, 359/161, 173, 176, 179, 188, 195

(56) References Cited

U.S. PATENT DOCUMENTS 5,502,588 A * 3/1996 Abram ..................... 359/154
5,801,862 A * 9/1998 Desurvire .................. 359/124
5,852,687 A * 12/1998 Wickham ..................... 385/14
5,877,881 A * 3/1999 Miyauchi .................... 359/161

FOREIGN PATENT DOCUMENTS

EP  0576 208 A1  12/1993

OTHER PUBLICATIONS

Patent Abstracts of Japan vol. 097, No. 003, Mar. 31, 1997 & JP 08 286218 A (Nippon Telegr & Amp; Teleph Corp & LT; NTT & GT), Nov. 1, 1996.

Nakazawa M et al: "40Gbit/s WDM (10Gbit/sx 4 Unequally Spaced Channels) Solitom Transmission Over 10000KMusing Synchronous Modulation and Narrow Band Optical Filtering" Electronics Letters, vol. 32, No. 9, Apr. 25, 1996, pp. 828–830, XP000595674.

Nakazawa M: "10Gbit/s Soliton Data Transmission Over One Million Kilometers" Electronics Letters, vol. 27, No. 14, Jul. 4, 1991, pp. 1270–1272, XP000240658.

LeClerc O et al.: "Assessment of 80Gbit/s (4X20Gbit/s) Regenerated WDM Soliton Transoceanic Transmission" Electronic Letters, vol. 32, No. 12, Jun. 9, 1996.

* cited by examiner

Primary Examiner—Jason Chan
Assistant Examiner—Agustin Bello
(74) Attorney, Agent, or Firm—Sughrue Mion, PLLC

(57) ABSTRACT

The invention enables wavelength division multiplexed (WDM) solitons conveyed by an optical fiber to be regenerated synchronously. The invention consists in using optical delay lines, in particular of the photorefractive filter type, prior to the regenerators so as to resynchronize a subset of the m soliton channels, and in placing the regenerator at a position where the n–m other soliton channels are naturally synchronized.

11 Claims, 2 Drawing Sheets

METHOD AND DEVICE FOR ON-LINE REGENERATION OF A SIGNAL TRANSMITTED BY WAVELENGTH DIVISION MULTIPLEXED SOLITONS AND OPTICAL TELECOMMUNICATION SYSTEM COMPRISING SUCH A REGENERATING DEVICE

The invention relates to the field of telecommunications by optical fiber, and more particularly to telecommunications over long distances. For very long distance optical fiber links, such as transoceanic links, it is known to use a signal of the so-called "soliton" type having special spectral properties that enable the signal to propagate along the dispersive fiber without appreciable chromatic dispersion, i.e. advantage is taken of the way refractive index depends on the intensity of the signal to counterbalance chromatic dispersion, or vice versa. The spectral shape of the signal is preserved in spite of the effects of propagation distance, which are thus mainly concerned with line losses. Line losses can be compensated by in-line optical amplification, e.g. by means of erbium-doped fiber amplifiers (EDFAs).

When transmitting solitons with in-line amplification (EDFA) the problems that remain to be solved are known:

1) Gordon-Haus jitter which causes uncertainty concerning the arrival times of the bits of the signal; and
2) the accumulation of noise that comes from the optical amplifiers amplifying spontaneous emission.

One solution to that problem is put forward in EP-A-6 576 208. In that document, a plurality of filters having various center frequencies are inserted at points along a link for transmitting solution type signals, thereby enabling the solitons to be amplified periodically without amplifying spontaneous emission noise exponentially. In that system, the solitons are not regenerated. According to that document, an advantage of such a system is that it is compatible with transmission in the form of a wavelength division multiplex (WDM).

Synchronous modulation for regenerating solitons in-line is described in the document: "10 Gbit/s soliton data transmission over one million kilometers" by Nakazawa et al., published in Elect. Lett., 27 (14), pp. 1270–72, Jul. 4, 1991.

That document teaches using an $LiNO_3$ optical modulator to perform synchronous modulation of solitons, with a clock signal generated using the same clock as that used for the soliton source. A very long distance link was simulated using a 500 km long fiber loop with an erbium-doped filter optical amplifier every 50 km and with regeneration once per trip round the loop. Because of the dispersion of the soliton transmission fiber, which lies in the range −0.7 ps/km/nm to −2.2 ps/km/nm with a mean value of −1.5 ps/km/nm, the travel time for making one trip round the loop depends on the wavelength of the soliton. That is why such a system is incompatible with WDM transmission, as emphasized in the above-mentioned document EP-A-0 576 208 (cf. page 2, lines 21–24).

Other documents in the state of the art relate to WDM type optical links.

For example, the document "Wavelength division multiplexing with solitons in ultra-long distance transmission using lumped amplifiers" by L. F. Mollenauer et al., published in Journal of Lightwave Tech., 9 (3), pp. 362–367, March 1991, proposes a system for transmitting WDM solitons with periodic optical amplification for transoceanic distances (9000 km). The teaching of that document relates mainly to collisions between solitons of different wavelengths. That document gives typical values for various parameters in such a link so as to limit the Gordon-Haus jitter that stems from interaction between adjacent channels. Nevertheless, in all the cases considered in that document, synchronous arrival of solitons at the end of the link is neither provided nor required.

The various aspects of managing dispersion in non-regenerated WDM systems are also considered in the document "Dispersion managements on soliton transmission in fibers with lumped amplifiers" by S. Kumar et al., published in Proc. Int'l. Symposium on Physics and Applications of Optical Solitons in Fibers, Kyoto, Japan, pp. 1–12, Nov. 14–17, 1995 (cf. last chapter of the document).

Thus, on reading the documents of the prior art, it can be seen that optical links having a plurality of wavelength division multiplexed channels do not enable solitons to be regenerated since the channels are not synchronous. In this context, the question of synchronous regeneration is therefore beside the point.

That is why, starting from well-established prejudices of the person skilled in the art it would not appear possible to envisage very high data rate WDM optical links over very long distances using wavelength division multiplexed solitons and regeneration for eliminating Gordon-Haus jitter and for maintaining the optimum spectral shape of the solitons.

An object of the invention is to mitigate the drawbacks of the prior art.

To this end, the invention provides apparatus for regenerating an optical signal in the form of a bit stream represented by solitons defined in particular by a propagation wavelength and a bit rate, said apparatus comprising a clock recovery circuit for extracting a clock signal from said optical signal and an optical modulator for regenerating said solitons, and being characterized in that it includes, upstream from the modulator, synchronization means for synchronizing solitons emitted on n channels having respective different wavelengths, where n>1, said channels and said different wavelengths being associated with different group times, said synchronization means having m optical delay lines, where $1 \leq m \leq n$, the delay $\tau_i$ for the line i, where $1 \leq i \leq m$, being selected in such a manner as to compensate for the differences between the group times associated with the various channels.

In an advantageous embodiment, the synchronization means have m optical delay lines, where $m \leq n$, the delay $\tau_i$ for channel i, where $1 \leq i < m$, being selected in such a manner as to compensate for the group time differences between m channels, and also have at least one line without optical delay for the n−m other channels.

In particular, the synchronization means comprise a single line without optical delay, said line without optical delay being designed to receive multiplexed solitons emitted over a plurality of channels.

In a presentlt preferred, first embodiment, the synchronization means includes an optical line fitted with m photorefractive filters in series, the frequency of each filter being associated with the frequency of a respective channel, and the respective position of each filter i, where $1 \leq i \leq m$, being selected so as to produce said delay $\tau_i$ for the solitons emitted on channel i; control means for applying the solitons received by the synchronization means to said optical line and for applying the solitons reflected by the filters of said optical line to an outlet port of the synchronization means; and an optical coupler for conveying the solitons emitted on the n−m channels which are not associated with a filter to the outlet port of the synchronization means. In this embodiment, the control means is a three-part optical circulator.

In a second embodiment of the invention, the synchronization means comprises a demultiplexer, a set of m lines in parallel, each including a length of optical delay line, a multiplexer, and at least one line without optical delay disposed between the demultiplexer and the multiplexer.

In a third embodiment of the invention, the synchronization means comprise: a divider; a set of m lines in parallel each having a respective filter for selecting one channel, and a length of optical delay line; a concentrator; and at least one line without optical delay between the divider and the concentrator, said line without delay having a filter for selecting at least one channel.

The invention also provides an optical transmission system for conveying signals each of which is in the form of a bit stream represented by solitons, which solitons are defined in particular by a propagation wavelength and by a bit rate, said transmission system comprising at least an emitter and a receiver interconnected by an optical fiber, said system including at least one optical regenerator apparatus of the invention.

Advantageously, in such an optical transmission system, each regenerator apparatus is disposed at a distance $Z_R$ from said emitter or from the preceding regenerator apparatus, where the distance $Z_R$ is selected in such a manner that its product with the arrival time difference $\delta\tau_g = \tau_g(\lambda_1) \cdot \tau_g(\lambda_l)$ satisfies the following condition:

$$[kT-T/a] < \delta\tau_g Z_R < [kT+T/a]$$

where: k is an integer; $a \geq 4$; T is the bit time; $Z_R$ is in km; $dt_g$ is in ps.km$^{-1}$; and $\lambda_1$ and $\lambda_l$ are the end wavelengths of the spectrum band defined by said subset of n–m channels.

In a particularly advantageous manner, the clock recovery circuit extracts from the optical signal a signal of wavelength $\lambda_k$ lying in the range $\lambda_1$ to $\lambda_l$, such that $\tau_g(\lambda_k) \cdot Z_R = kT$.

The characteristics and advantages of the invention appear more clearly from the following description of embodiments given by way of non-limiting illustration and with reference to the accompanying drawings, in which.

In all the figures, the same numerical references refer to the same elements, and the figures are not necessarily to scale for reasons of clarity.

Figure 1:
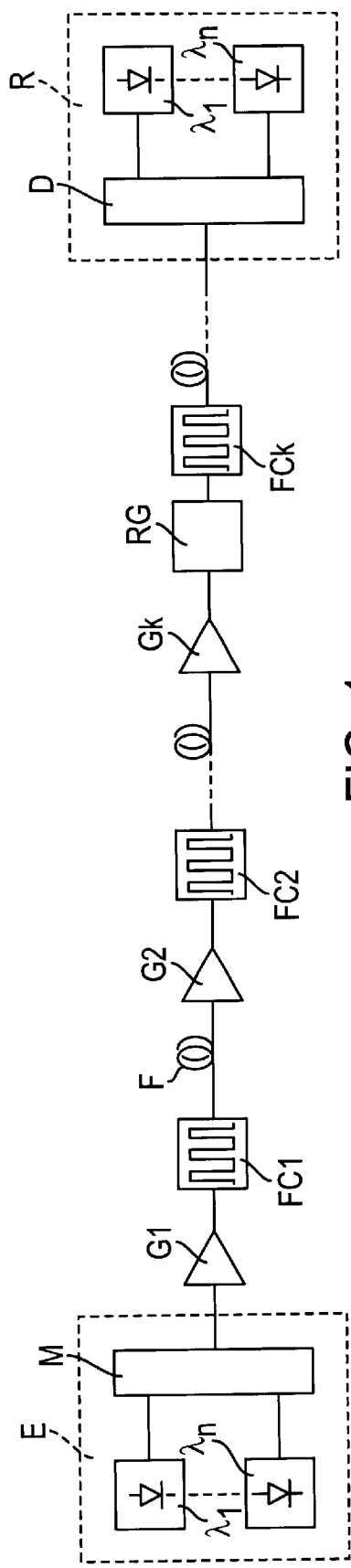
FIG. 1 is a block diagram of an optical fiber optical transmission system of the invention.

One solution to the problem of synchronizing solitons emitted over different channels is described in French patent application No. 96/00732 filed on Jan. 23, 1996 in the name of Alcatel Submarine Networks and entitled "Méthode et dispositif de régénération en ligne d'un signal transmis par solitons multiplexés en longueur d'onde via la modulation synchrone et systeme de télécommunications optiques utilisant la méthode" [A method and apparatus for in-line regeneration by synchronous modulation of a signal transmitted by wavelength division multiplexed solitons, and an optical telecommunications system using the method ], the content of which is incorporated herein by reference.

The synchronization principle developed in that prior patent application is summarized below insofar as it is necessary for understanding the present invention. The reader is invited to refer to the prior patent application for more detail.

In that prior patent application, it is proposed to take account of the optical path lengths travelled by the solitons as a function of their wavelengths, so that the solitons are synchronized, at least approximately, at the location where the modulator is located.

Because of chromatic dispersion, the soliton signals emitted on the various channels lose synchronization as they propagate along an optical fiber. However, all of the signals are periodic and have identical bit rates on emission. This gives rise to solitons in adjacent channels "colliding" at various points along the transmission line (see theoretical description in the above-cited article by Mollenauer et al.). As a result, and given the frequency offsets between the various channels, all of the channels are synchronized with one another at certain points that are regularly spaced apart along the line. The proposal is to determine what this spacing is and to place regenerators at such points of synchronization, for the purpose of performing synchronous modulation using a single modulator and without demultiplexing.

For example, for two channels transmitted at $\lambda_1$ and $\lambda_2$, where $\lambda_0$ is the zero dispersion wavelength, and for $D1=\lambda_2-\lambda_1$, the arrival time difference at the modulator results from the group time difference $\delta\tau_g = \tau_g(\lambda_2) - \tau_g(\lambda_1)$, i.e.:

$$\delta\tau_g = \frac{1}{2}\left(\frac{dD}{d\lambda}\right)_{\lambda_o} \{(\lambda_2-\lambda_0)^2 - (\lambda_1-\lambda_0)^2\}$$

$$= \frac{1}{2}\left(\frac{dD}{d\lambda}\right)_{\lambda_o} \{\Delta\lambda^2 + 2\Delta\lambda(\lambda_1-\lambda_0)\}(\text{ps}\cdot\text{km}^{-1})$$

when the slope $(dD/d\lambda)_{\lambda0}$ is non-zero, and otherwise $\delta\tau_g = D.(\lambda_2-\lambda_1)$.

The method proposed thus consists in using a single synchronous modulator for all of the WDM channels by carefully choosing the distance between the transmitter and the first modulator, or between successive modulators, on the basis of the spacing between the channels and the chromatic dispersion of the fiber, so as to ensure that all of the channels are synchronized wherever they pass through a modulator. In practice, the distance $Z_R$ between modulators is selected so that the group time difference $\delta\tau_g$ satisfies the condition:

$$[kT-T/a] < \delta\tau_g Z_R < [kT+T/a]$$

where k is an integer, $a \geq 4$, and T is the bit time (for $Z_R$ in km, and $dt_g$ in ps.km$^{-1}$). This constraint makes it possible to obtain approximate synchronization between two WDM channels having wavelengths $\lambda_1$ and $\lambda_2$. Better synchronization can be obtained by reducing the width of the time windows (i.e., by increasing a), until the desired degree of synchronization is obtained.

The technique proposed in that prior patent application is implemented in the context of the present invention. More precisely, in a transmission system having n WDM channels, a modulator is placed at a location where a subset of n–m, where m<n, channels are naturally synchronized, using the technique described in the prior patent application, and the remaining m channels are brought into synchronization with the subset of channels.

This combination of two synchronization techniques presents clear advantages: the constraint on positioning the modulator is less severe than in the prior patent application since it is no longer necessary for all of the channels to be naturally synchronized (with increasing number of WDM channels, the distance $Z_R$ between two successive points where all of the channels are naturally synchronized increases, thereby increasing the attenuation, the dispersion, etc. of the signals), and the synchronization means can be simpler since it need only process a portion of the channels.

FIG. 1 is a diagram of an example of an optical fiber optical transmission system suitable for conveying and regenerating a WDM optical signal made up of solitons. The system comprises an optical fiber F, an optical emitter E, at least one regenerator device RG, a plurality of in-line optical amplifiers G1, G2, . . . , GK, . . . , a plurality of channel filters FC1, FC2, . . . , FCk, . . . , and an optical receiver R. The optical emitter E comprises a plurality of optical sources suitable for emitting solitons at respective frequencies $\lambda_1$, $\lambda_2$, . . . , $\lambda_n$ and a multiplexer M for injecting the solitons into the optical fiber F. Symmetrically, the receiver comprises a demultiplexer D and a plurality of optical detectors suitable for receiving the respective solitons at frequencies $\lambda_1$, $\lambda_2$, . . . , $\lambda_n$. The optical amplifiers are distributed, preferably in regular manner, along the line to compensate for the attenuation to which the solitons are subjected. In conventional manner, the optical amplifiers may be of the erbium-doped fiber amplifier (EDFA) type. The channel filters FC1, FC2, . . . , FCk, . . . are located downstream from the optical amplifiers G1, G2, . . . ; they serve to reduce the time width of the solitons, and thus to reduce time jitter. The term "channel filter" is used to designate a bandpass filter which passes a plurality of narrow bands of different center frequencies corresponding to the wavelengths of the various channels in the wavelength division multiplexed system.

An optical transmission system as shown in FIG. 1, but lacking in-line regenerator apparatus, is to be found in the state of the art, cf. the above-cited articles by L. F. Mollenauer et al.

Figure 2:
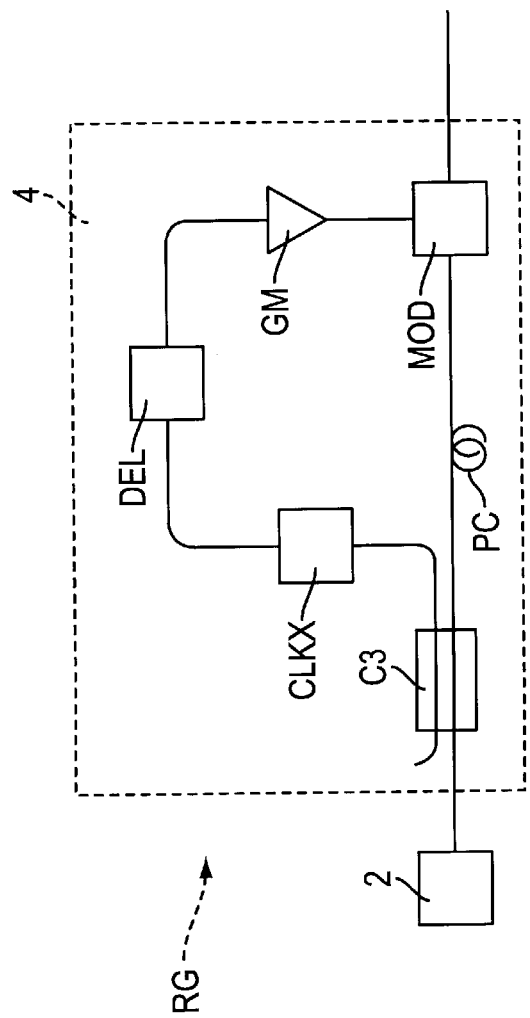
FIG. 2 is a block diagram of regenerator apparatus of the invention.

The present invention lies specifically in the fact of providing in-line regeneration for an optical signal of the WDM soliton type. FIG. 2 is a block diagram of regenerator apparatus of the invention.

The regenerator apparatus RG comprises synchronization means 2 and a modulator 4. The modulator 4 is a conventional modulator and is used for regenerating a soliton type signal at a signal frequency, i.e. a non-WDM signal. Such a modulator is described in particular in the above-cited article by Nakazawa et al. It comprises an optical modulator MOD, e.g. of the $LiNO_3$ type, for performing synchronous modulator of solitons, which modulator is controlled by an electronic control signal produced by a clock circuit on the basis of the in-line soliton signal. The clock recovery means comprise an optical coupler C3 for extracting a fraction of the optical signal, a clock extraction circuit CLKX, a delay line for providing a delay DEL, and an amplifier GM for delivering the control power needed to operate the $LiNO_3$ modulator MOD.

The modulation means may include birefringent polarization control devices PC. Such devices may equally well be provided after the channel filters (FIG. 1).

For simultaneous synchronous modulation of a plurality of wavelength multiplexed soliton signals to be possible, i.e., for it to be possible to modulate signals at different wavelengths, having different group velocities, and thus different travel times, it is necessary for the solitons emitted in the various channels to be synchronous.

Various embodiments of regenerator apparatus of the invention are described below.

Figure 3:
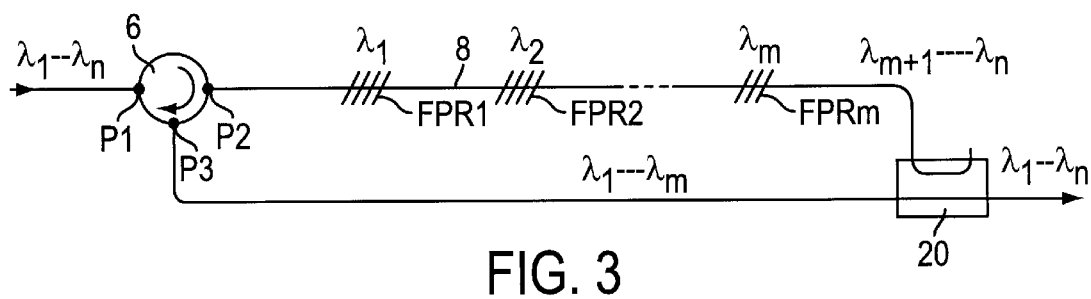
FIG. 3 shows a first embodiment of the synchronization means of the invention, designed for resynchronizing the solitons emitted by the n channels of an n-channel WDM link.

A presently preferred synchronization means is shown diagrammatically in FIG. 3. It comprises an optical circulator 6 having three ports P1, P2, P3, an optical line having an optical fiber 8 with m photorefractive filters FPR1, FRP2, . . . , FRPm that reflect at the wavelengths, $\lambda_1$, $\lambda_2$, . . . ,$\lambda^m$ (m<n) respectively, and an optical coupler 20 for conveying the n–m other channels which are not reflected by the photorefractive filters to the outlet port of the synchronization means. The optical circulator is designed to apply a signal received an its port P1 to its port P2, and a signal received on its port P2 to its port P3, The ports P1 and P3 constitute respectively the inlet and the outlet of the synchronization means 2. It will thus be understood that the soliton signal emitted in frequency channel $\lambda_i$, where $1 \leq i \leq n$, reaches port P1, is taken to port P2, travels along fiber 8 to a filter FPRi, where it is reflected back to the circulator 6, and is finally taken to port P3. The relative positions of the photoreflective filters are selected in such a manner as to compensate for the delays between the signals on channels 1 to m relative to the signals on channels m+1 to n, where the latter signals are naturally synchronized (the modulator being placed at a location where those channels are synchronous). The delays can be determined as follows.

For each channel (wavelength $\lambda$), the group time (per km) is given by the relationship:

$$\tau_g(\lambda) = \tau_g(\lambda_o) + \frac{1}{2}\left(\frac{dD}{d\lambda}\right)_{\lambda_o}(\lambda - \lambda_0)^2$$

where D is the mean dispersion of the transmission fiber and $\lambda_0$ is the wavelength for zero dispersion. At the inlet to the regenerator, the group time difference $\delta\tau_{k1}=\tau_g(\lambda_k)-\tau_g(\lambda_n)$ between channel n taken as a reference channel and channel k is thus given by:

$$\delta\tau_{k1} = \tau_g(\lambda_k) - \tau_g(\lambda_n)$$
$$= \frac{1}{2}\left(\frac{dD}{d\lambda}\right)_{\lambda_n}\{(\lambda_k - \lambda_0)^2 - (\lambda_n - \lambda_0)^2\}$$
$$= \frac{1}{2}\left(\frac{dD}{d\lambda}\right)_{\lambda_n}\{\Delta\lambda_{kl}^2 + 2\Delta\lambda_{kl}(\lambda_n - \lambda_0)\}$$

where $\Delta\lambda_{k1}=\lambda_k-\lambda_n$.

The above two relationships relate to the case where the dispersion slope $(dD/d\lambda)_{so\ o}$is non-zero. It is nevertheless possible and indeed advantageous to make a system in which the dispersion slope is periodically corrected (compensated) by inserting short lengths of opposite-characteristic fiber, or indeed to make a transmission fiber whose slope is zero or at least flattened. Regardless of whether the system has a dispersion slope that is compensated or that is genuinely zero, the group time (per km) is given by the following relationship:

$$\tau_g(\lambda)=\tau_g(\lambda_n)+D(\lambda-\lambda_n)$$

where D is the (constant) dispersion in the spectral range $\{\lambda_n, \ldots \lambda\}$. The group time difference $\delta\tau_{k1}=\tau_g(\lambda_k)\cdot\tau_g(\lambda_n)$ is given by the relationship $\delta\tau_{k1}=D.\Delta\lambda_{k1}$.

If $T_{bit}$ represents the bit time (or the synchronous modulation period), a number $N_{k1}$ (for k=1, . . . , n) can be defined as being the integer which satisfies the following relationship for channel k: $N_{k1}\cdot T_{bit} \leq \delta\tau \leq (N_{k1}+1)\cdot T_{bit}$, i.e. $N_{k1} = E(\delta\tau_{k1}/T_{bit})$ where E(x) represents the integer portion of the argument of x. The integer $N_{k1}$ represents the maximum bit time number included in the delay between channel n and channel k. The quantity that matters is not the accumulated delay between two individual bits belonging to channels n and k, but rather the relative delay between the corresponding time windows. The advance of window k relative to window n is thus given by $\Delta \tau_{k1}$ (advance)=$\delta \tau_{k1}$ - $N_{k1}.T_{bit}$ and the delay of the window k relative to window n is given by:

$$\Delta \tau_{kl}(\text{delay}) = T_{bit} - \Delta \tau_{kl}(\text{advance})$$

$$= (N_{kl} + 1) \cdot T_{bit} - \delta \tau_{kl}$$

$$= \left\{ 1 - \left[ \frac{\delta \tau_{kl}}{T_{bit}} - E\left(\frac{\delta \tau_{kl}}{T_{bit}}\right) \right] \right\}.$$

Observe that for practical considerations, an arbitrary additional quantity can be added to this delay providing the additional quantity is equal to an integer number of bit times $T_{bit}$. When the delay is applied to each channel, all of the signals are still synchronous at the inlet to the modulator.

The photorefractive filters are advantageously implemented in the form of Bragg filters photoetched directly in the fiber. They provide the advantage of a high extinction ratio and they make it possible to define the delay for each channel very accurately.

Figure 4:
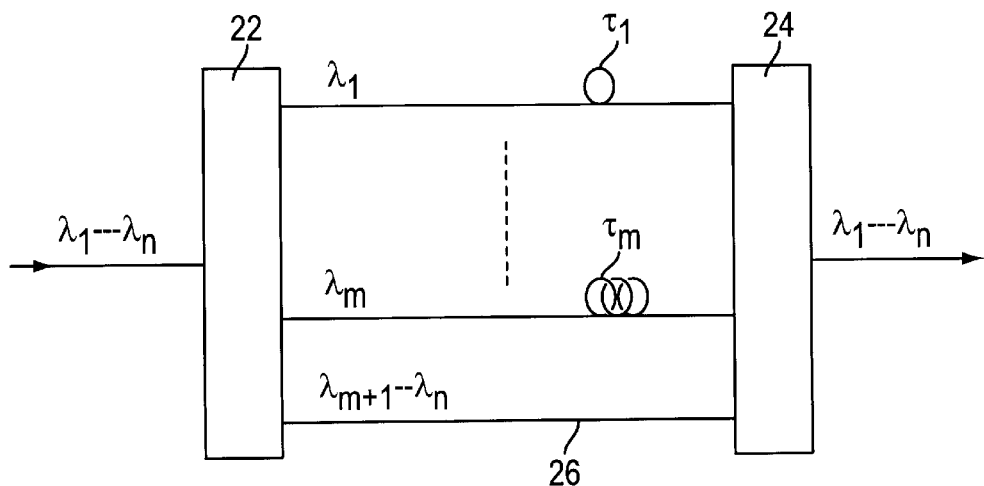
FIG. 4 shows a second synchronization means of the invention designed to resynchronize the solitons emitted by the n channels of an n-channel WDM link.

Another embodiment of the synchronization means is shown in FIG. 4. It comprises a demultiplexer 22 having one inlet and m+1 outlets, a set of m+1 lines in parallel, and a multiplexer 24 having m+1 inlets and one outlet. Amongst the set of lines in parallel, a line 26 associated with all of the channels that are naturally synchronized does not include any optical delay line, while each of the m other lines is associated with a respective one of the other channels and includes a respective optical delay line $\tau_i$, where $1 \leq i \leq m$, which imparts an optical delay such that all of the n channels are synchronized at the outlet from the synchronization means.

Figure 5:
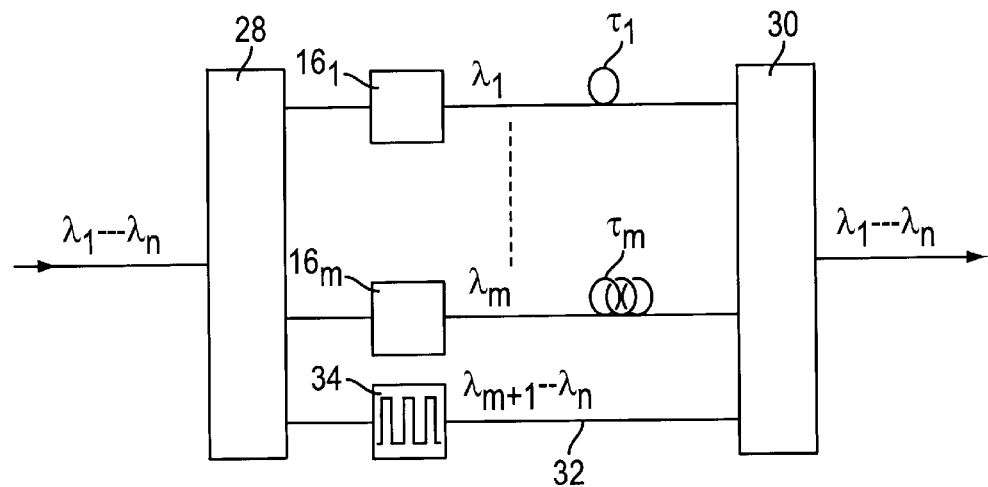
FIG. 5 shows a third embodiment of the synchronization means of the invention, designed for resynchronizing the solitons emitted by the n channels of an n-channels WDM link.

Another variant embodiment of the synchronization means is shown in FIG. 5. It comprises a distributor 28 having one inlet and m+1 outlets, a set of m+1 lines in parallel, and a concentrator 30 having m+1 inlets and one outlet. Amongst the set of lines in parallel, one line 32 is associated with all of the channels that are naturally synchronized and includes a channel filter 34 corresponding to those channels, and a set of m lines each associated with one channel and each having a respective optical delay line such that all of the n channels are synchronized at the outlet from the synchronization means. In this way, the filter $16_i$, where $1 \leq i \leq m$, of line i and the delay $\tau_i$ imparted by the portion of delay line in line i are selected respectively to pass the solitons emitted on channel i and the delay said solitons by a delay $\tau_i$ such that the solitons travelling over line i are synchronized at the outlet from the concentrator with the solitons transmitted over the line 32.

The synchronization means shown in FIG. 5 provide better extinction of adjacent channels than the embodiment shown in FIG. 4, but this is achieved at the cost of insertion loss that increases as a function of $n^2$. This insertion loss is nevertheless acceptable so long as the number n channels is small. When transmitting a frequency multiplex on n=2 or 3 channels, the embodiment of FIG. 5 is presently preferred over the embodiment of FIG. 4.

Synchronization means other than those described with reference to FIGS. 3 to 5 are known and can be used in the context of the present invention. For example, a selective delay per channel can be obtained by using an optical fiber having dispersion compensation or an optical fiber including a photorefractive chip filter (where the term chirp is well known to the person skilled in the art and designates a transmission medium in which low frequencies propagate faster than high frequencies).

The optical coupler used for recovering the clock signal can be placed on the transmission line as shown in FIG. 2, but it can also be placed on the optical fiber 8 (FIG. 3) or on one of the m+1 parallel lines (FIG. 4) or (FIG. 5), or at some other point of the synchronization means.

The invention is not limited to the embodiments shown, but on the contrary it extends to means equivalent to those described and to all embodiments that comply with the accompanying claims.

What is claimed is:

1. Apparatus for regenerating an optical signal in the form of a bit stream represented by solitons defined in particular by a propagation wavelength and a bit rate, said apparatus comprising a clock recovery circuit for extracting a clock signal from said optical signal and an optical modulator for regenerating said solitons, and being characterized in that it includes, upstream from the modulator, synchronization means for synchronizing solitons emitted on n channels having respective different wavelengths, where n>1, said channels and said different wavelengths being associated with different group times, said synchronization means having m optical delay lines, where $1 \leq m \leq n-2$, the delay $\tau_i$ for the line i, where $1 \leq i \leq m$, being selected in such a manner as to compensate for the differences between the group times associated with various channels.

2. Apparatus according to claim 1, characterized in that the synchronization means have m optical delay lines, where $m \leq n-2$, the delay $\tau_i$ for channel i, where $1 \leq i < m$, being selected in such a manner as to compensate for the group time differences between m channels, and also have at least one line without optical delay for the n–m other channels.

3. Apparatus according to claim 2, characterized in that the synchronization means comprise a single line without optical delay, said line without optical delay being designed to receive multiplexed solitons emitted over a plurality of channels.

4. Apparatus according to claim 1, characterized in that the synchronization means include an optical line fitted with m photorefractive filters in series, the frequency of each filter being associated with the frequency of a respective channel, and the respective position of each filter i, where $1 \leq i \leq m$, being selected so as to produce said delay $\tau_i$ for the solitons emitted on channel i; control means for applying the solitons received by the synchronization means to said optical line and for applying the solitons reflected by the filters of said optical line to an outlet port of the synchronization means; and an optical coupler for conveying the solitons emitted on the n–m channels which are not associated with a filter to the outlet port of the synchronization means.

5. Apparatus according to claim 4, characterized in that said control means is a three-part optical circulator.

6. Apparatus according to claim 1, characterized in that the synchronization means comprises a demultiplexer, a set of m lines in parallel, each including a length of optical delay line, a multiplexer, and at least one line without optical delay disposed between the demultiplexer and the multiplexer.

7. Apparatus according to claim 1, characterized in that the synchronization means comprise: a divider; a set of m lines in parallel each having a respective filter for selecting one channel, and a length of optical delay line; a concentrator; and at least one line without optical delay between the divider and the concentrator, said line without delay having a filter for selecting at least one channel.

8. Apparatus according to claim 1, characterized in that it includes a channel filter at the output from the synchronous modulator.

9. An optical transmission system for conveying signals each of which is in the form of a bit stream represented by solitons, which solitons are defined in particular by a propagation wavelength and by a bit rate, said transmission system comprising at least and a manner and a receiver interconnected by an optical fiber, said system being characterized in that it includes at least one optical regenerator apparatus according to claim 1.

10. A system according to claim 9, characterized in that each regenerator apparatus is disposed at a distance $Z_R$ from said emitter or from the preceding regenerator apparatus, where the distance $Z_R$ is selected in such a manner that its product with the arrival time difference $\delta\tau_g = \tau_g(\lambda_1) - \tau_g(\lambda_l)$ satisfies the following condition:

$$[kT - T/a] < \delta\tau_g Z_R < [kT + T/a]$$

where: k is an integer; $a \geq 4$; T is the bit time; $Z_R$ is in km; $dt_g$ is in ps.km$^{-1}$; and $\lambda_1$ and $\lambda_l$ are the end wavelengths of the spectrum band defined by said subset of n–m channels.

11. A system according to claim 10, characterized by a clock recovery circuit which extracts a signal of wavelength $\lambda_k$ from the optical signal, where $\lambda_k$ lines in the wavelength range $\lambda_1$ to $\lambda_l$ such that $\tau_g(\lambda_k).Z_R = kT$.

* * * * *